United States Patent
Wu et al.

(10) Patent No.: US 10,679,318 B2
(45) Date of Patent: Jun. 9, 2020

(54) COMPUTER SYSTEMS THAT ARE ABLE TO REDUCE MEMORY DATA FLOW AND GRAPHICS PROCESSING METHODS THEREOF

(71) Applicant: Shanghai Zhaoxin Semiconductor Co., Ltd., Shanghai (CN)

(72) Inventors: Fengxia Wu, Shanghai (CN); Deming Gu, Shanghai (CN); Heng Que, Shanghai (CN); Yi Zhou, Shanghai (CN); Ying Wang, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 16/381,314

(22) Filed: Apr. 11, 2019

(65) Prior Publication Data
US 2020/0118239 A1    Apr. 16, 2020

(30) Foreign Application Priority Data

Oct. 12, 2018  (CN) .......................... 2018 1 1190749

(51) Int. Cl.
| | |
|---|---|
| *G06T 1/20* | (2006.01) |
| *G06T 15/00* | (2011.01) |
| *G06T 1/60* | (2006.01) |
| *G06T 15/80* | (2011.01) |
| *G09G 5/36* | (2006.01) |

(52) U.S. Cl.
CPC .................. *G06T 1/20* (2013.01); *G06T 1/60* (2013.01); *G06T 15/005* (2013.01); *G06T 15/80* (2013.01); *G09G 5/363* (2013.01)

(58) Field of Classification Search
None
See application file for complete search history.

(56) References Cited

U.S. PATENT DOCUMENTS

| | | | | |
|---|---|---|---|---|
| 5,550,962 | A * | 8/1996 | Nakamura | G06T 11/00 345/505 |
| 2012/0212488 | A1* | 8/2012 | Yu | G06T 15/40 345/422 |
| 2014/0184623 | A1* | 7/2014 | Frascati | G06T 1/20 345/522 |
| 2015/0213638 | A1* | 7/2015 | Dimitrov | G06T 15/005 345/619 |

(Continued)

*Primary Examiner* — Joni Hsu
(74) *Attorney, Agent, or Firm* — McClure, Qualey & Rodack, LLP

(57) ABSTRACT

A graphics processing method is provided, adapted to a graphic processing unit, the steps including: receiving, via a CSP, a first command associated with all render targets from a display driver; determining, via the display driver, sizes and areas of a plurality of tiles in each frame; repeatedly controlling, via a scissor pool unit, a graphics processing unit to perform drawing processing for each tile according to the first command; comparing, via a signature comparing unit of a cache memory, a signature of a current tile of a current frame and a signature of a tile corresponding to the same position of a previous frame and generating a comparison result; and determining whether to flush the dirty data of the current tile stored in the cache memory from the cache memory to a memory access unit according to the comparison result.

14 Claims, 8 Drawing Sheets

(56) References Cited

U.S. PATENT DOCUMENTS

2016/0035128 A1* 2/2016 Zhao .................. G06T 1/20
    345/522
2016/0379334 A1* 12/2016 Wu .................. G06F 1/3287
    345/582
2017/0243323 A1* 8/2017 Croxford ............ H04N 13/106

* cited by examiner

COMPUTER SYSTEMS THAT ARE ABLE TO REDUCE MEMORY DATA FLOW AND GRAPHICS PROCESSING METHODS THEREOF

CROSS REFERENCE TO RELATED APPLICATIONS

This Application claims priority of China Patent Application No. 201811190749.1, filed on Oct. 12, 2018, the entirety of which is incorporated by reference herein.

BACKGROUND OF THE INVENTION

Field of the Invention

The disclosure relates in general to computer systems and graphics processing methods thereof, and it relates in particular to computer systems that are able to reduce memory data flow and graphics processing methods thereof.

Description of the Related Art

A graphics processing unit (GPU) is a very important operation unit. Most graphics processing units use Immediate Rendering Architecture (IRA) to render an entire scene. Since IRA begins executing a task once each of the rendering commands is received, the rendering speed is very fast. However, data stored in the cache may be frequently replaced, so that the data flow of the memory access unit is significantly increased. Therefore, the problem of how to reduce the data flow of the memory access unit during execution of a graphics task needs to be solved urgently.

BRIEF SUMMARY OF THE INVENTION

In an embodiment, a graphics processing method, which is adapted in a graphics processing unit, comprises: a CSP receives a first command which is associated with all render targets from a display driver; the display driver determines the sizes and areas of a plurality of tiles in each frame; a scissor pool unit repeatedly controls the graphics processing unit to perform drawing processing on each tile, according to the first command; a signature comparing unit of a cache memory compares the signature of the current tile of the current frame to the signature of a tile that corresponds to the same position of the previous frame and generates a comparison result; and a determination is made as to whether to flush the dirty data of the current tile stored in the cache memory from the cache memory to a memory access unit according to the comparison result. When the graphics processing unit performs the drawing processing on the tile, the graphics processing unit only draws the render targets that overlap the tile.

According to an embodiment of the invention, the graphics processing method further comprises: the CPU generates a drawing command that corresponds to a drawing task; the display driver detects a plurality of frames that can be rendered in a tile-based rendering mode in the drawing command; the display driver adds a first mark command and a second mark command to a head and a tail of the drawing command that corresponds to part of the frame respectively; and the display driver packs the first mark command, the specified command, and the second mark command to be the first command.

According to an embodiment of the invention, the graphics processing method further comprises: the cache packs the data of the current tile into the current frame and gives a specified value to the data as the signature of the current tile.

According to an embodiment of the invention, the graphics processing method further comprises: the cache compresses the signature to a size of 64 bits.

According to an embodiment of the invention, when the signature of the current tile in the current frame is the same as the signature of the tile in the same location in the previous frame, the cache does not flush the dirty data of the current tile to the memory access unit.

According to an embodiment of the invention, when the signature of the current tile in the current frame is not the same as the signature of the tile in the same location in the previous frame, the cache flushes the dirty data of the current tile to the memory access unit.

According to an embodiment of the invention, the graphics processing unit at least comprises a command stream parser, a shader execution unit, a rasterizer, and a testing unit, wherein the testing unit is at least configured to perform a depth & stencil test and an alpha test.

In an embodiment, a computer system comprises a display driver, a scissor pool unit, a signature comparison unit, and a memory access unit. The display driver is deposited in a CPU and is configured to generate a first command associated with all render targets and to determine sizes and areas of a plurality of tiles in each frame. The scissor pool unit is deposited in a command stream parser and configured to repeatedly control a graphics processing unit to perform a drawing processing on each of the tiles. The signature comparison unit is deposited in a cache and configured to compare a signature of a current tile in a current frame with a signature of a tile in the same location in a previous frame and to generate a comparison result. The memory access unit is configured to store the signature corresponding to the current tile and dirty data. When the graphics processing unit performs the drawing processing on the tile, the graphics processing unit only draws the render targets that are overlapped with the tiles.

According to an embodiment of the invention, the computer system further comprises a CPU. The CPU is configured to generate a drawing command. The display driver further detects that a plurality of frames being able to be rendered in a tile-based rendering mode, adds a first mark command and a second mark command to a head and a tail of part of the drawing command corresponding to the frames respectively, and packs the first mark command, the specified command, and the second mark command as the first command.

According to an embodiment of the invention, the cache further packs data of the current tile in the current frame and gives a specified value to the data as the signature corresponding to the current tile.

According to an embodiment of the invention, the cache further compresses the signature to a size of 64 bits.

According to an embodiment of the invention, when the signature of the current tile in the current frame is the same as the signature of the tile in the same location in the previous frame, the cache does not flush the dirty data of the current tile to the memory access unit.

According to an embodiment of the invention, when the signature of the current tile in the current frame is not the same as the signature of the tile in the same location in the previous frame, the cache flushes the dirty data of the current tile to the memory access unit.

According to an embodiment of the invention, the graphics processing unit at least comprises a command stream parser, a shader execution unit, a rasterizer, and a testing unit, wherein the testing unit is at least configured to perform a depth & stencil test and an alpha test.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
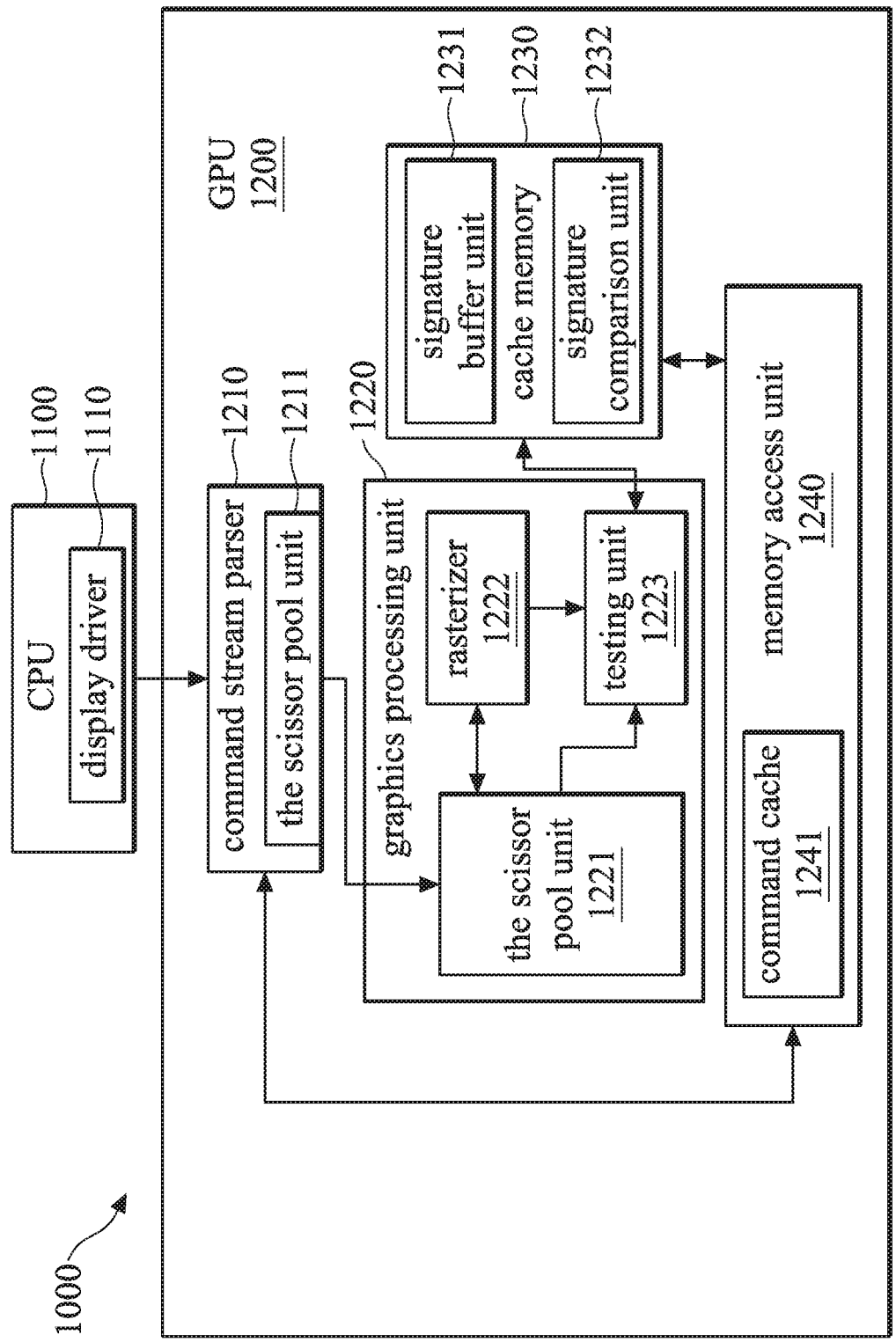
FIG. 1 is a block diagram of a computer system in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a computer system in accordance with an embodiment of the invention. As shown in FIG. 1, the computer system 1000 includes a CPU 1100 and a GPU 1200, in which the display driver 1110 executed by the CPU 1100 and the GPU 1200 may support OpenGL ES for instance. The GPU 1200 at least includes a command stream parser (CSP) 1210, a graphics processing unit 1220, a cache memory 1230, and a memory access unit 1240. The command stream parser 1210 is configured to receive the drawing command from the display driver 1110 of the CPU 1100 in the computer system 1000, and transmits the drawing command to the graphics processing unit 1220 to perform some operations associated with graphics rendering. The graphics processing unit 1220 may include a shader execution unit 1221, a rasterizer 1222, and a testing unit 1223. The shader executing unit 1221 may include, for example, a vector shader, a geometric shader, a pixel shader, etc. the rasterizer 1222 is configured to perform perspective divide, clipping, and selecting and implementing a viewport/scissor to generate the color information of all pixels in the generated primitive. The testing unit 1223 is configured to perform the depth & stencil test, the alpha test, etc. on the rasterized graphics data. The tested graphics data will be flushed into the memory access unit 1240 through the cache 1230. It should be noted that elements in the graphics processing unit 1220 may vary with different systems and could be implemented using any method, not limited to the embodiment of FIG. 1. The cache 1230, which is configured to store the image data that is the result of graphics processing performed by the graphics processing unit 1220, further includes a signature buffer unit 1231 and a signature comparison unit 1232. After the graphics processing unit 1220 performs operations associated with drawing processing on each tile, the cache 1230 may give a corresponding specific value to each tile and the specific value is the signature of the corresponding tile. The signatures are then stored in the signature buffer unit 1231. The signature comparison unit 1232 is configured to determine whether the data corresponding to the current tile is the same as the data corresponding to the previous tile stored in the signature buffer unit 1231 before the data corresponding to the current tile is flushed to the memory access unit 1240. The signature comparison unit 1232 is also configured to determine whether to flush the data corresponding to the current tile to the memory access unit 1240 according to the determination result, in order to reduce the data flow of the memory access unit. The signature buffer unit 1231 and the signature comparison unit 1232 can be implemented by logic circuits.

According to an embodiment of the invention, when the CPU 1100 generates a drawing command corresponding to a graphic task, the display driver 1110 first determines which frames could be rendered in the tile-based rendering mode, and adds specific commands to the head and the tail of the commands corresponding to the frames for the command stream parser 1210 to further analyze. For example, when the commands to render in the tile-based rendering are received, the display driver 1110 may add the command marked as "group-begin" (first mark command) to the head of the commands, and add the command marked as "group_end" (second mark command) to the tail of the commands for the sake of claiming that the commands between "group_begin" and "group_end" can be rendered in the tile-based rendering mode. However, when the command stream parser 1210 reads the command "group_begin", the commands that will be used (for example, commands used in applications, drawing command, etc.) are loaded to the command cache 1241 until the command "group_end" is read.

Figure 2:
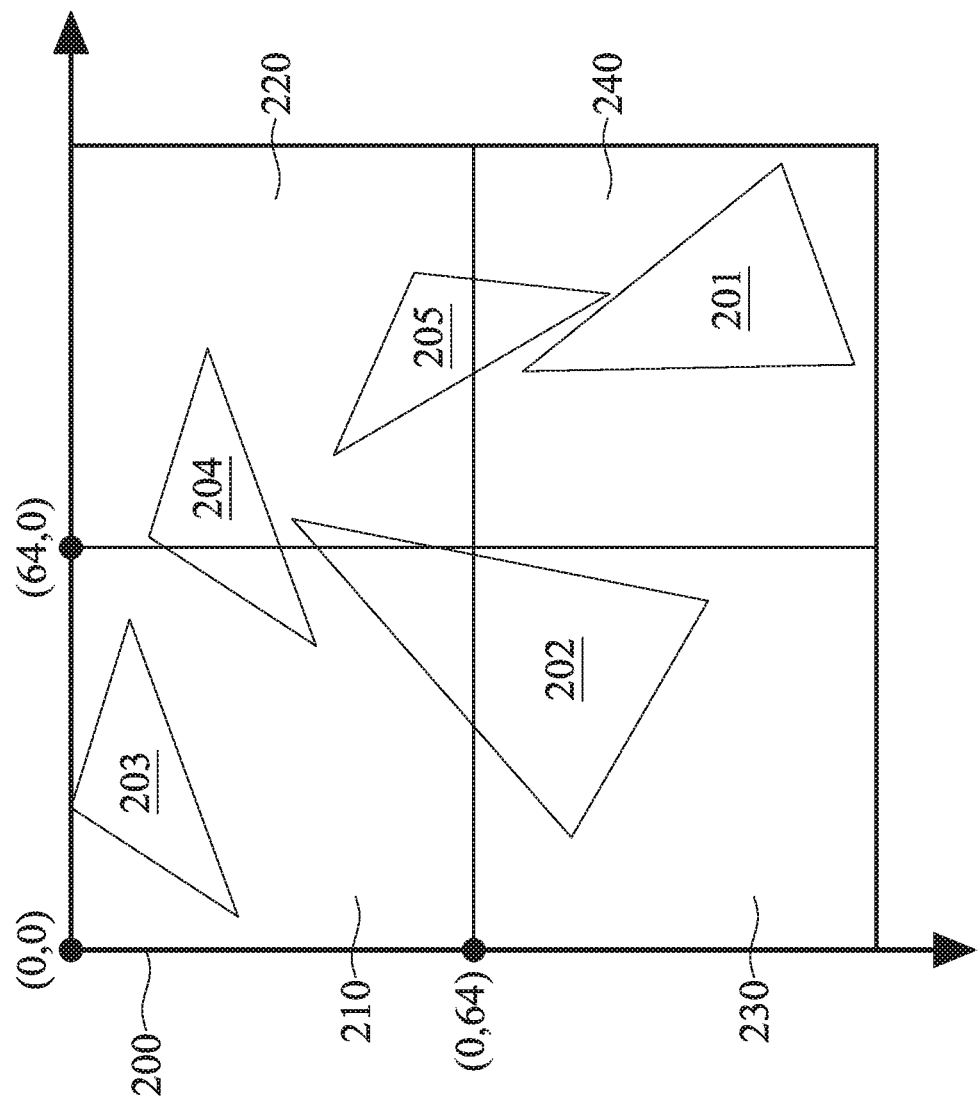
FIG. 2 is a schematic diagram of rendering a current frame in a tile-based rendering mode in accordance with an embodiment of the invention.

Then, the scissor pool unit 1211 repeatedly controls the graphics processing unit 1220 to perform the drawing processing on each tile of the current frame according to the commands in the command cache 1241. For example, FIG. 2 is a schematic diagram of rendering a current frame in a tile-based rendering mode in accordance with an embodiment of the invention. As shown in FIG. 2, the size of the current frame 200 is 128*128, and the triangles 201~205 are the render targets to be draw in the current frame 200 during a graphic task. In the related art, when the current frame 200 is drawn in the immediate mode rendering (IMR), the graphics processing unit may perform the drawing task on the triangles 201~205 sequentially. However, in the situation stated above, when each of the triangles is performed the graphics processing, the command stream parser 1210 must frequently access the related commands from the memory access unit 1240 such that the data flow of the memory access unit 1240 is greatly increased.

However, in an embodiment of the invention, the display driver 1110 divides the current frame 200 into a plurality of tiles with a fixed size, and then individually performs the drawing processing on each tile, in order to reduce the data flow of the memory access unit 1240. For example, as shown in FIG. 2, the current frame 200 is divided into 4 tiles 210~240 with a size of 64*64, which starts from (0,0), (64,0), (0,64), and (64,64). The scissor pool unit 1211 then repeatedly performs the drawing processing on the tiles 210~240 according to the commands in the command cache 1241 based on the information stated above.

Figure 3A:
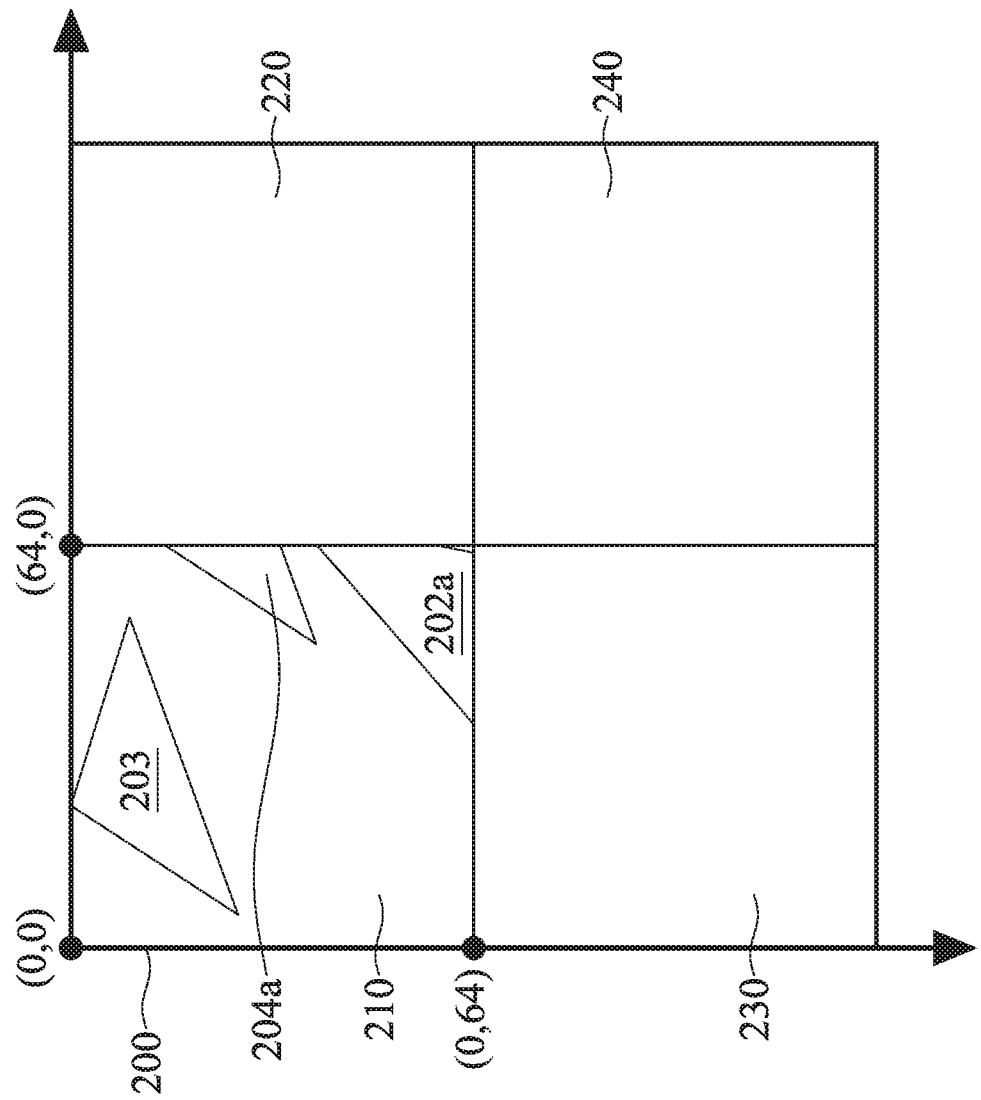
FIGS. 3A-3D is a schematic diagram of performing drawing processing on a plurality of tiles in a frame in accordance with an embodiment of the invention.
Figure 3B:
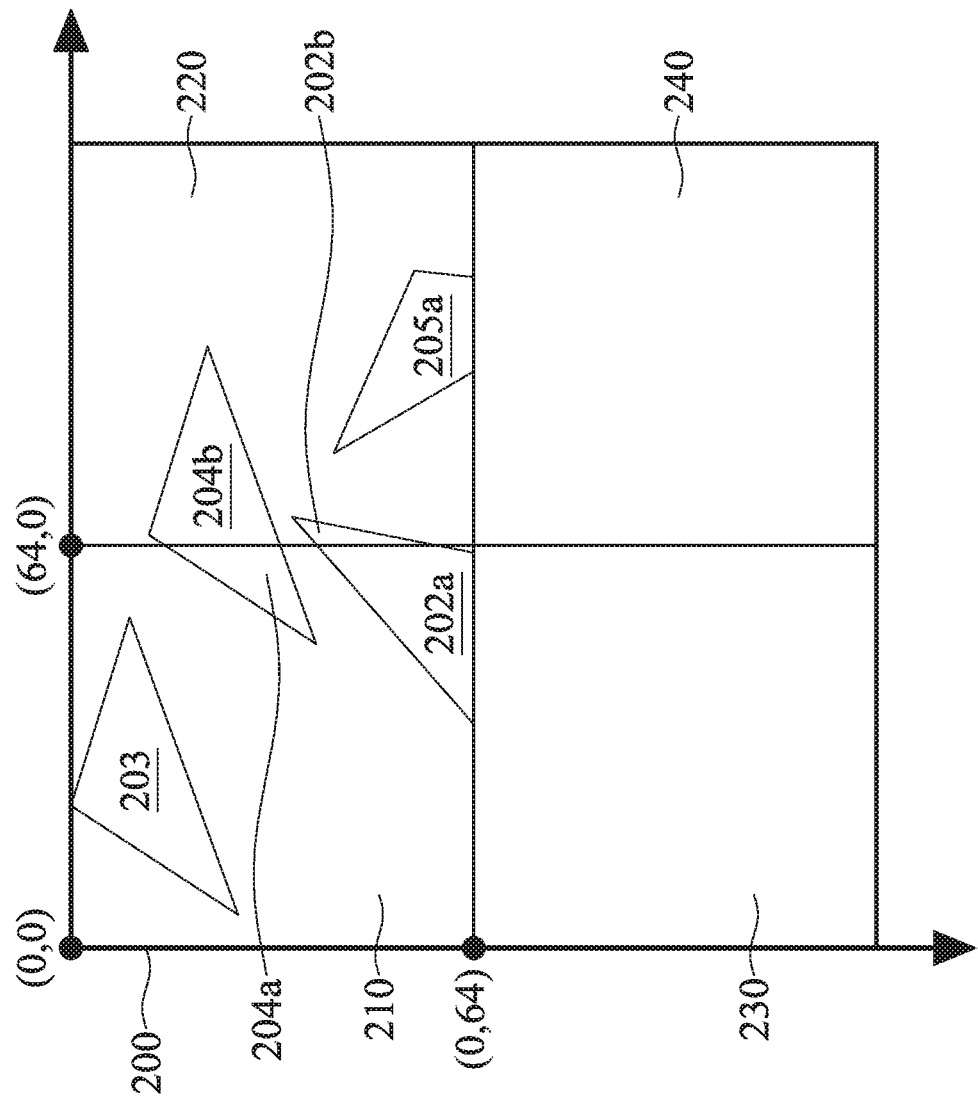
Figure 3C:
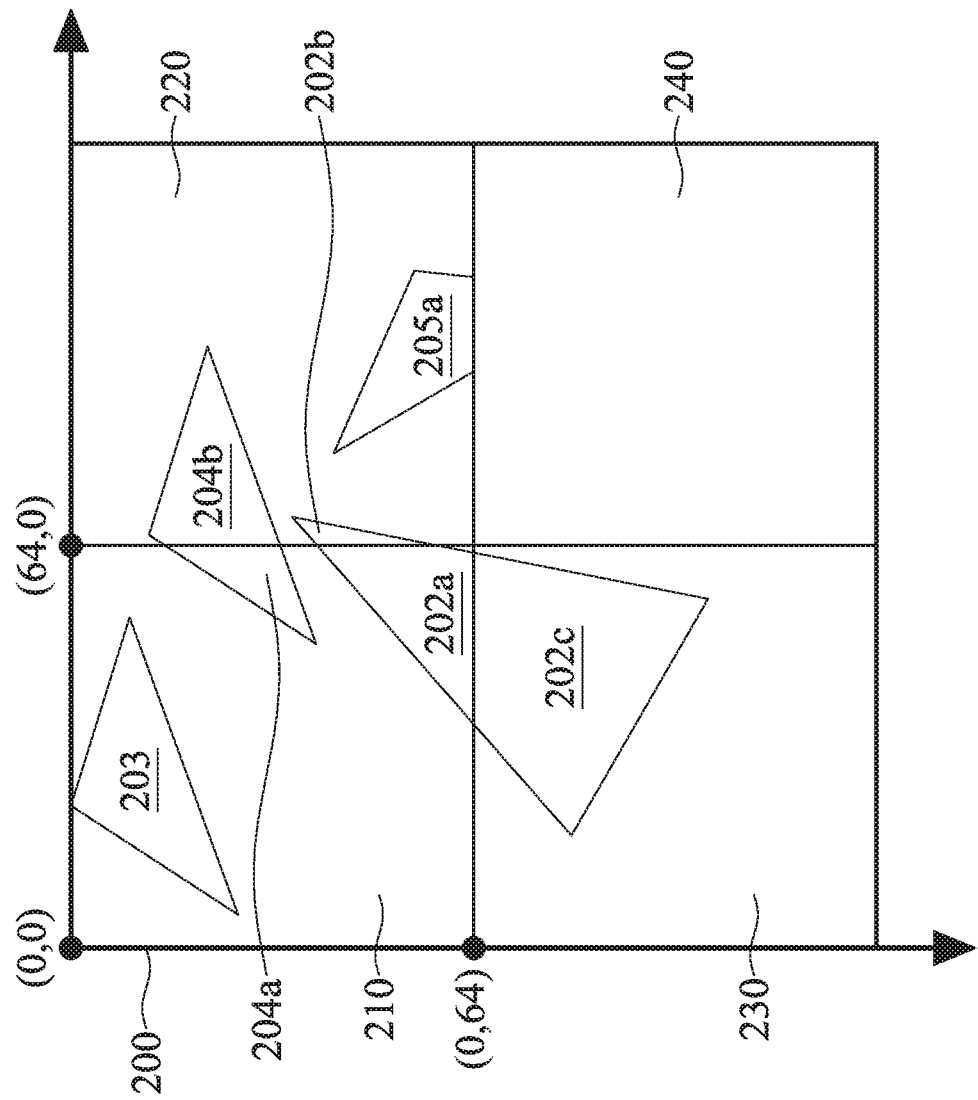
Figure 3D:
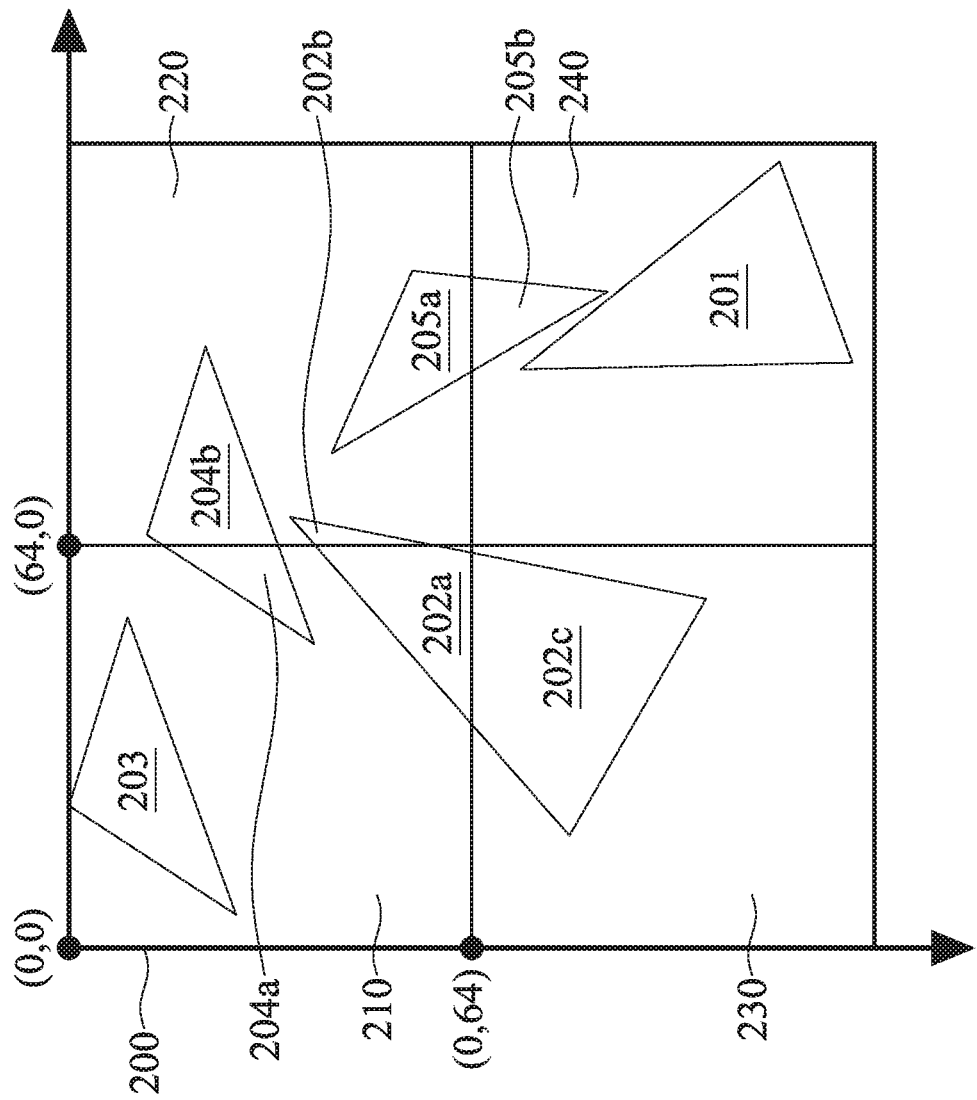

As shown in FIG. 3A, the graphics processing unit 1220 first performs the drawing processing on the tile 210 on left top. During the graphics processing, the graphics processing unit 1220 merely draws the part of the render targets that overlaps with the tile 210. For example, in FIG. 3A, part of the triangles 202 and 204 overlaps the tile 210 (i.e., the partial triangles 202a and 204a), and the whole triangle 203 is in the tile 210. Therefore, when the graphics processing unit 1220 draws the tile 210, only the triangle 203, the first part 202a of the triangle 202, and the first part 204a of the triangle 204 are drawn. Similarly, as shown in FIG. 3B, when the graphics processing unit 1220 performs the drawing processing on the tile 220, only the second part 202b of the triangle 202, the second part 204b of the triangle 204, and the first part 205a of the triangle 205 are drawn. In FIG. 3C, only the third part 202c of the triangle 202 is drawn in the tile 230. Regarding the tile 240, the graphics processing unit 1220 draws the whole triangle 201 and the second part 205b of the triangle 205.

Then, when the image data corresponding to each tile that has been performed the graphics processing is obtained, the cache 1230 packs the data of each tile in each frame and gives a specific value to the data, in which the specific value is a signature corresponding to one of the tiles. The specific value corresponding to the data is configured to record the compressed data that is drawn to the corresponding tile. Then, the signature is written to the signature buffer unit 1231. In addition, before the signature is written to the signature buffer unit 1231, the size of the signature is compressed to be 64 bits. When the signature is compressed, the data corresponding to the signature may be divided into a plurality of sections, and the data of all the sections is compressed to be data with 64 bits. When the drawing task corresponding to the current frame is finished, the cache 1230 flushes the data corresponding to each tile to the memory access unit 1240. Then, during the drawing task corresponding to next frame, when the image data that has been performed the graphics processing, the signature comparison unit 1232 first determines whether the signature stored in the signature buffer unit 1231 corresponding to tile at the same position is the same as that corresponding to the current tile, instead of immediately flushing the data corresponding to each tile to the memory access unit 1240. When the signature comparison unit 1232 determines that the signature corresponding to the current tile is the same as that stored in the signature buffer unit 1231 corresponding to a tile of the previous frame, the cache 1230 does not flush the signature corresponding to the current tile to the memory access unit 1240. On the contrary, when the signature comparison unit 1232 determines that the signature corresponding to the current tile is not the same as that stored in the signature buffer unit 1231 corresponding to a tile of the previous frame, the cache 1230 flushes the undated data corresponding to the current tile to the memory access unit 1240. The determination executed by the signature comparison unit 1232 may reduce the number of times an unnecessary flushing is performed, in order to reduce the data flow of the memory access unit 1240.

Figure 4A:
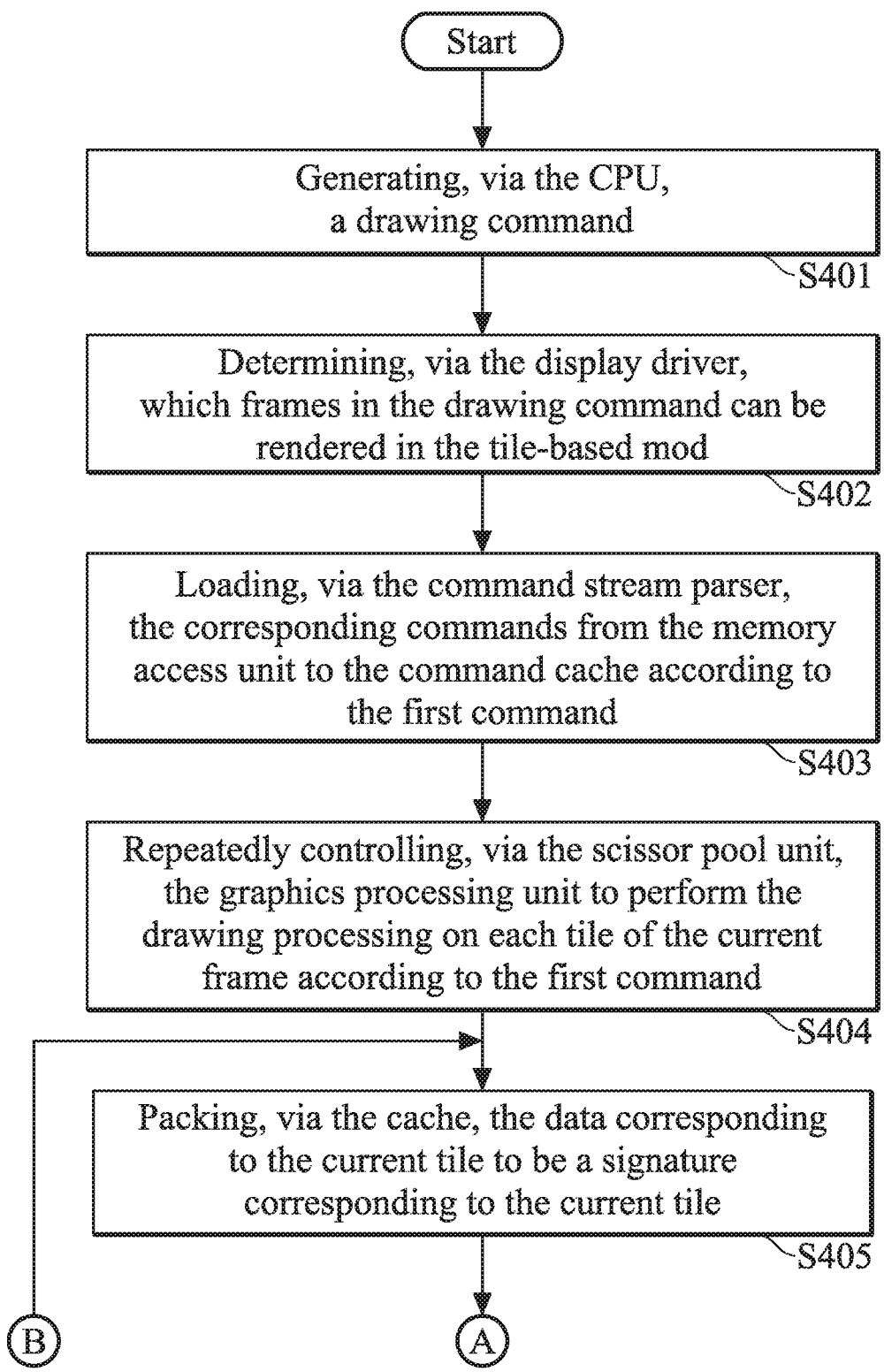
FIGS. 4A-4B is a flow chart of a graphics processing method in accordance with another embodiment of the invention.
Figure 4B:
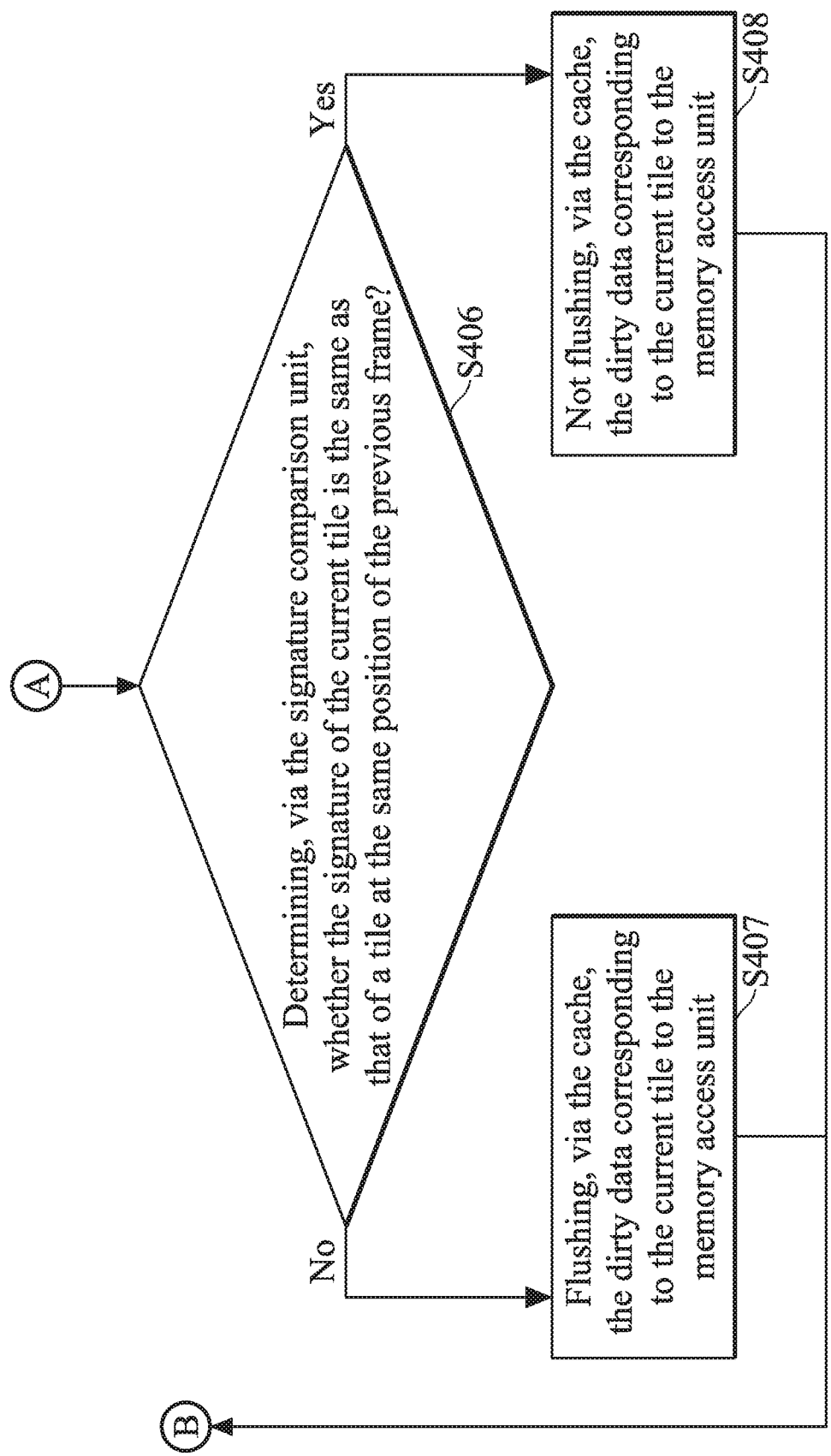

FIGS. 4A-4B is a flow chart of a graphics processing method in accordance with another embodiment of the invention. In Step S401, the CPU 1100 generates a drawing command corresponding to a drawing task. In Step S402, the display driver 1110 determines which frames in the drawing command can be rendered in the tile-based mode, and adds a specific command to the head and tail of the commands corresponding to the frames to be a first command. In Step S403, the command stream parser 1210 loads the corresponding commands from the memory access unit 1240 to the command cache 1241 according to the first command. In Step S404, the scissor pool unit 1211 repeatedly controls the graphics processing unit 1220 to perform the drawing processing on each tile of the current frame according to the commands loaded from command cache 1241. In Step S405, when the image data corresponding to the current tile that has been performed the graphics processing is obtained, the cache 1230 packs the data corresponding to the current tile to be a signature corresponding to the current tile.

Then, in Step S406, the signature comparison unit 1232 determines whether the signature of the current tile is the same as that of a tile at the same position of the previous frame. When the signature comparison unit 1232 determines that the signature corresponding to the current tile is not the same as that stored in the signature buffer unit 1231 of a tile corresponding to the previous frame, Step S407 is executed. The cache 1230 flushes the dirty data corresponding to the current tile to the memory access unit 1240. On the contrary, when the signature comparison unit 1232 determines that the signature corresponding to the current tile is the same as the signature stored in the signature buffer unit 1231 corresponding to a tile of the previous frame, Step S408 is executed. The cache 1230 does not flush the dirty data corresponding to the current tile to the memory access unit 1240.

In summary, the computer system and the graphics processing method thereof provided herein determines whether to flush the signature stored in the cache memory corresponding to the memory access unit based on the signature comparison unit comparing the data of a tile corresponding to the current frame with the data of a tile at the same position corresponding to the previous frame. Therefore, the unnecessary number of times of flushing data can be reduced to reserve the bandwidth of the memory, in order to reduce the data flow of the memory access unit.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A graphics processing method, adapted in a graphics processing unit, comprising:
receiving, via a command stream parser (CSP), a first command associated with all render targets from a display driver;
determining, via the display driver, sizes and areas of a plurality of tiles in each frame;

repeatedly controlling, via a scissor pool unit, a graphics processing unit to perform drawing processing on each tile according to the first command;

comparing, via a signature comparing unit of a cache memory, a signature of a current tile of a current frame and a signature of a tile corresponding to the same position of a previous frame and generating a comparison result; and determining whether to flush the dirty data of the current tile stored in the cache memory from the cache memory to a memory access unit according to the comparison result;

wherein when the graphics processing unit performs the drawing processing on the tile, the graphics processing unit only draws the render targets that overlap the tile.

2. The graphics processing method of claim 1, further comprising:

generating, via a central processing unit (CPU), a drawing command corresponding to a drawing task;

detecting, via the display driver, a plurality of frames that can be rendered in a tile-based rendering mode in the drawing command;

adding, via the display driver, a first mark command and a second mark command to a head and a tail of the drawing command corresponding to part of the frame respectively; and packing, via the display driver, the first mark command, the specified command, and the second mark command to be the first command.

3. The graphics processing method of claim 1, further comprising:

packing, via the cache, the data of the current tile in the current frame and giving a specified value to the data as the signature of the current tile.

4. The graphics processing method of claim 3, further comprising:

compressing, via the cache, the signature to a size of 64 bits.

5. The graphics processing method of claim 1, wherein when the signature of the current tile in the current frame is the same as the signature of the tile in the same location in the previous frame, the cache does not flush the dirty data of the current tile to the memory access unit.

6. The graphics processing method of claim 5, wherein when the signature of the current tile in the current frame is not the same as the signature of the tile in the same location in the previous frame, the cache flushes the dirty data of the current tile to the memory access unit.

7. The graphics processing method of claim 1, wherein the graphics processing unit at least comprises a command stream parser, a shader execution unit, a rasterizer, and a testing unit, wherein the testing unit is at least configured to perform a depth & stencil test and an alpha test.

8. A computer system, comprising:

a display driver, deposited in a central processing unit (CPU) and configured to generate a first command associated with all render targets and to determine sizes and areas of a plurality of tiles in each frame;

a scissor pool unit, deposited in a command stream parser and configured to repeatedly control a graphics processing unit to perform drawing processing on each of the tiles;

a signature comparison unit, deposited in a cache and configured to compare a signature of a current tile in a current frame with a signature of a tile in the same location in a previous frame and to generate a comparison result, wherein the signature comparison unit is also configured to determine whether to flush the data corresponding to the current tile to the memory access unit according to the comparison result; and a memory access unit, configured to store the signature corresponding to the current tile and dirty data;

wherein when the graphics processing unit performs the drawing processing on the tile, the graphics processing unit only draws the render targets that are overlapped with the tiles.

9. The computer system of claim 8, wherein:

the CPU is configured to generate a drawing command; and wherein the display driver further detects that a plurality of frames being able to be rendered in a tile-based rendering mode, adds a first mark command and a second mark command to a head and a tail of part of the drawing command corresponding to the frames respectively, and packs the first mark command, the specified command, and the second mark command as the first command.

10. The computer system of claim 8, wherein the cache further packs data of the current tile in the current frame and gives a specified value to the data as the signature corresponding to the current tile.

11. The computer system of claim 10, wherein the cache further compresses the signature to a size of 64 bits.

12. The computer system of claim 8, wherein when the signature of the current tile in the current frame is the same as the signature of the tile in the same location in the previous frame, the cache does not flush the dirty data of the current tile to the memory access unit.

13. The computer system of claim 12, wherein when the signature of the current tile in the current frame is not the same as the signature of the tile in the same location in the previous frame, the cache flushes the dirty data of the current tile to the memory access unit.

14. The computer system of claim 8, wherein the graphics processing unit at least comprises a command stream parser, a shader execution unit, a rasterizer, and a testing unit, wherein the testing unit is at least configured to perform a depth & stencil test and an alpha test.

* * * * *